United States Patent
Yu et al.

(10) Patent No.: US 11,368,188 B2
(45) Date of Patent: Jun. 21, 2022

(54) CARRIER CHANNEL CONTROL METHOD AND DEVICE, NON-TRANSITORY STORAGE MEDIUM, AND PROCESSOR

(71) Applicant: Gree Electric Appliances, Inc. of Zhuhai, Guangdong (CN)

(72) Inventors: Weiyou Yu, Guangdong (CN); Jie Tang, Guangdong (CN); Quanzhou Liu, Guangdong (CN); Zhongzheng Li, Guangdong (CN); Wencan Wang, Guangdong (CN); Zhongwen Deng, Guangdong (CN); Tieying Ye, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 37 days.

(21) Appl. No.: 16/976,894

(22) PCT Filed: Dec. 12, 2018

(86) PCT No.: PCT/CN2018/120644
§ 371 (c)(1),
(2) Date: Aug. 31, 2020

(87) PCT Pub. No.: WO2019/165820
PCT Pub. Date: Sep. 6, 2019

(65) Prior Publication Data
US 2021/0006291 A1 Jan. 7, 2021

(30) Foreign Application Priority Data
Mar. 2, 2018 (CN) .......................... 201810176111.6

(51) Int. Cl.
*H04B 3/04* (2006.01)
*H04B 3/54* (2006.01)

(52) U.S. Cl.
CPC ................. *H04B 3/04* (2013.01); *H04B 3/54* (2013.01)

(58) Field of Classification Search
CPC .... H04B 3/04; H04B 3/54; H04B 2203/5495; F24F 11/88; H04L 27/2602
See application file for complete search history.

(56) References Cited

U.S. PATENT DOCUMENTS

2016/0127056 A1* 5/2016 Soman ..................... H04B 3/54
370/463
2016/0277070 A1* 9/2016 Soman ................ H04L 27/2608
2017/0033893 A1  2/2017 Kang et al.

FOREIGN PATENT DOCUMENTS

| CN | 104753567 A | 7/2015 |
| CN | 106411458 A | 2/2017 |

(Continued)

OTHER PUBLICATIONS

Al-Mawali et al., "Adaptive power loading for OFDM-based power line communications impaired by impulsive noise", Power Line Communications and Its Applications (ISPLC), 2020 International Symposium on, IEEE, Piscataway, NJ, USA, Mar. 28, 2010, pp. 178-182.

*Primary Examiner* — David S Huang
(74) *Attorney, Agent, or Firm* — The Webb Law Firm (57) ABSTRACT

Disclosed are a carrier channel control method and apparatus, a storage medium and a processor. The carrier channel control method includes: applying an air conditioner control signal to a power line carrier to obtain a power line communication (PLC) signal, wherein, the power line carrier comprises a plurality of communication subcarriers; determining PLC noise values respectively corresponding to each of the communication subcarriers used to transmit the PLC signal; generating state data of carrier channels respectively corresponding to the communication subcarriers based on (Continued)

each of the PLC noise values which corresponds to one of the communication subcarriers, wherein each of the carrier channels respectively corresponds one of the communication subcarriers; and controlling each of the carrier channels respectively according to the state data of each of the carrier channels.

14 Claims, 6 Drawing Sheets

(56) References Cited

FOREIGN PATENT DOCUMENTS

| | | | |
|---|---|---|---|
| CN | 106656270 A | 5/2017 | |
| CN | 108566230 A | 9/2018 | |
| EP | 1331744 A1 | 7/2003 | |
| WO | WO-2011046357 A2 * | 4/2011 | .............. F24F 11/62 |

* cited by examiner

CARRIER CHANNEL CONTROL METHOD AND DEVICE, NON-TRANSITORY STORAGE MEDIUM, AND PROCESSOR

CROSS-REFERENCE TO RELATED APPLICATIONS

This application is the United States national phase of International Application No. PCT/CN2018/120644 filed Dec. 12, 2018, and claims priority to Chinese Application No. 201810176111.6 filed Mar. 2, 2018, the disclosures of which are hereby incorporated by reference in their entirety.

BACKGROUND OF THE INVENTION

Field of the Invention

The present disclosure relates to the technical field of power line communication, in particular, to a carrier channel control method and device, a non-transitory storage medium and a processor.

Description of Related Art

As an emerging communication technology, power line communication has been widely used in electric meters, photovoltaic power plants and other fields. Its communication mechanism is to couple communication signals into power lines. Electronic magnetic compatibility standards for electrical equipments generally have very strict requirements. Specifically, interferences of the electrical equipments to a power grid should be controlled within a certain range. When the power line communication technology is applied to an air conditioning system, there will be a conflict between communication signals and the requirements of the electronic magnetic compatibility standards usually.

SUMMARY OF THE INVENTION

Embodiments of the present disclosure provide a carrier channel control method and device, a non-transitory storage medium and a processor.

According to some embodiments of the present disclosure, a carrier channel control method is provided, comprising: applying an air conditioner control signal to a power line carrier to obtain a power line communication (PLC) signal, wherein, the power line carrier comprises a plurality of communication subcarriers; determining PLC noise values respectively corresponding to each of the communication subcarriers used to transmit the PLC signal; generating state data of carrier channels respectively corresponding to the communication subcarriers based on each of the PLC noise values which corresponds to one of the communication subcarriers, wherein each of the carrier channels respectively corresponds one of the communication subcarriers; and controlling each of the carrier channels respectively according to the state data of each of the carrier channels.

In some embodiments, determining the PLC noise values respectively corresponding to each of the communication subcarriers used to transmit the PLC signal comprises: obtaining the PLC noise values according to a monitoring instruction, wherein the monitoring instruction comprises frequency points respectively corresponding to each of the communication subcarriers to be monitored, and each of PLC noise value comprises a background noise applied by the air conditioning unit itself to the power line carrier.

In some embodiments, generating the state data of carrier channels respectively corresponding to the communication subcarriers based on each of the PLC noise values which corresponds to one of the communication subcarriers comprises: for each of the communication subcarriers, generating a noise power value corresponding to the communication subcarrier according to the corresponding PLC noise value; and generating the state data of the carrier channel corresponding to the communication subcarrier according to the noise power value.

In some embodiments, generating the state data of the carrier channel corresponding to the communication subcarrier according to the noise power value comprises: determining a minimum power value to transmit the PLC signal in a communication network where the communication subcarrier is located; determining a superimposed power value of a frequency point of the communication subcarrier according to the minimum power value and the corresponding noise power value; and generating the state data of the carrier channel according to the superimposed power value.

In some embodiments, generating the state data of the carrier channel according to the superimposed power value comprises: judging whether the superimposed power value is greater than an electronic magnetic compatibility (EMC) threshold corresponding to the frequency point; and generating the state data of the carrier channel according to the superimposed power value and the EMC threshold, in a case where the superimposed power value is greater than the EMC threshold corresponding to the frequency point.

In some embodiments, controlling each of the carrier channels respectively according to the state data of each of the carrier channels comprises: sending the state data of each of the carrier channels to a communication module, so that the communication module controls opening or closing of each of the carrier channels corresponding to each of the communication subcarriers according to the state data of each of the carrier channels.

According some embodiments of the present disclosure, a carrier channel control device is provided, comprising: an obtaining unit configured to apply an air conditioner control signal to a power line carrier to obtain a power line communication (PLC) signal, wherein, the power line carrier comprises a plurality of communication subcarriers; a determining unit configured to determine PLC noise values respectively corresponding to each of the communication subcarriers used to transmit the PLC signal; a generating unit configured to generate state data of carrier channels respectively corresponding to the communication subcarriers based on each of the PLC noise values which corresponds to one of the communication subcarriers, wherein each of the carrier channels respectively corresponds one of the communication subcarriers; and a controlling unit configured to control each of the carrier channels respectively according to the state data of each of the carrier channels.

According some embodiments of the present disclosure, non-transitory storage medium is provided, comprising a computer program, when executed by a processor, cause the processor to perform the carrier channel control method according to any one of embodiments.

According to some embodiments of the present disclosure, a processor for executing a program is provided, wherein the program when executed by the processor, cause the processor to perform the carrier channel control method according to any one of embodiments.

According some embodiments of the present disclosure, a carrier channel control device is provided, comprising: a processor; and a memory coupled to the processor and storing instructions that when executed by the processor, cause the processor to: apply an air conditioner control signal to a power line carrier to obtain a power line communication (PLC) signal, wherein, the power line carrier comprises a plurality of communication subcarriers; determine PLC noise values respectively corresponding to each of the communication subcarriers used to transmit the PLC signal; generate state data of carrier channels respectively corresponding to the communication subcarriers based on each of the PLC noise values which corresponds to one of the communication subcarriers, wherein each of the carrier channels respectively corresponds one of the communication subcarriers; and control each of the carrier channels respectively according to the state data of each of the carrier channels.

In some embodiments, determining the PLC noise values respectively corresponding to each of the communication subcarriers used to transmit the PLC signal comprises: obtaining the PLC noise values according to a monitoring instruction, wherein the monitoring instruction comprises frequency points respectively corresponding to each of the communication subcarriers to be monitored, and each of PLC noise value comprises a background noise applied by the air conditioning unit itself to the power line carrier.

In some embodiments, generating the state data of carrier channels respectively corresponding to the communication subcarriers based on each of the PLC noise values which corresponds to one of the communication subcarriers comprises: for each of the communication subcarriers, generating a noise power value corresponding to the communication subcarrier according to the corresponding PLC noise value; and generating the state data of the carrier channel corresponding to the communication subcarrier according to the noise power value.

In some embodiments, generating the state data of the carrier channel corresponding to the communication subcarrier according to the noise power value comprises: determining a minimum power value to transmit the PLC signal in a communication network where the communication subcarrier is located; determining a superimposed power value of a frequency point of the communication subcarrier according to the minimum power value and the corresponding noise power value; and generating the state data of the carrier channel according to the superimposed power value.

In some embodiments, generating the state data of the carrier channel according to the superimposed power value comprises: judging whether the superimposed power value is greater than an electronic magnetic compatibility (EMC) threshold corresponding to the frequency point; and generating the state data of the carrier channel according to the superimposed power value and the EMC threshold, in a case where the superimposed power value is greater than the EMC threshold corresponding to the frequency point.

In some embodiments, controlling each of the carrier channels respectively according to the state data of each of the carrier channels comprises: sending the state data of each of the carrier channels to a communication module, so that the communication module controls opening or closing of each of the carrier channels corresponding to each of the communication subcarriers according to the state data of each of the carrier channels.

BRIEF DESCRIPTION OF THE DRAWINGS

The accompanying drawings, which are comprised to provide a further understanding of the disclosure and are incorporated in and constitute a part of this specification, illustrate embodiments of the disclosure, and together with the illustrative embodiments of the present disclosure serve to explain the present disclosure, but are not limitation thereof. In the drawings.

DESCRIPTION OF THE INVENTION

In order to enable those skilled in the art to get a better understanding of the solutions of the present disclosure, the technical solutions of the embodiments of the present disclosure will be described clearly and completely in conjunction with the drawings of the embodiments of the present disclosure. Obviously, merely some embodiments of this disclosure, rather than all embodiments thereof, are given herein. All other embodiments obtained by those of ordinary skill in the art based on the embodiments of the present disclosure without creative efforts shall fall within the protection scope of the present disclosure.

It should be noted that the terms "first", "second" and the like in the description and claims of the present disclosure and the drawings are used to distinguish similar objects, and are not necessarily used to describe a specific order or sequence. It should be understood that the terms so used are interchanged where appropriate so that the embodiments of the disclosure described herein are implemented in an order other than those illustrated or described herein. Furthermore, the terms "comprising" and "having" and any of their variations are intended to cover non-exclusive inclusions, for example, a process, method, system, product, or device that comprises a series of steps or units need not be limited to those explicitly listed. In some embodiments, it comprises other steps or units not explicitly listed or inherent to this process, method, product or device.

For ease of description, some terms appearing in the present disclosure will be described in detail below.

Power Line Communication (PLC): a unique communication method for power systems. Power line Communication refers to the technology of using existing power lines to transmit analog or digital signals at a high speed through carriers.

Electronic Magnetic Compatibility (EMC): the ability of a device or system to operate in compliance with requirements in an electromagnetic environment without generating intolerable electromagnetic interference to any devices in the environment. EMC comprises two requirements: on the one hand, the electromagnetic interference generated by the device in the environment during normal operation should not exceed a certain limit; on the other hand, the device requires a certain degree of anti-interference to the electromagnetic interference existing in the environment, that is, electromagnetic sensitivity.

Power Line Communication technology: a power system communication in which power transmission lines are used as the transmission medium of carrier signals. Because the power transmission lines have very strong support structures on which more than 3 conductors are generally erected, the power transmission lines transmit carrier signals while transmitting power simultaneously.

Channel: physical channel to transfer information.

Coupling: it refers to a phenomenon that there is a close coordination and mutual influence between the input and output of two or more circuit elements or electrical networks, and energy is transmitted from one side to the other through interaction.

Carrier: a radio wave of a specific frequency, which is modulated to a waveform to transmit a signal, generally a sine wave.

Noise power: noise equivalent power, which is the power of incident infrared radiation required when the signal-to-noise ratio is 1, that is, the output voltage generated by the power of the infrared radiation projected on a microbolometer that is equal to the microbolometer's own the noise voltage.

According to some embodiments of the present disclosure, some embodiments of a carrier channel control method are provided. It should be noted that the steps shown in the flowchart is performed in a computer system that executes a set of computer-executable instructions. Although a logical sequence is shown in the flowchart, in some cases, the steps shown or described are performed in an order different from that shown herein.

Figure 1:
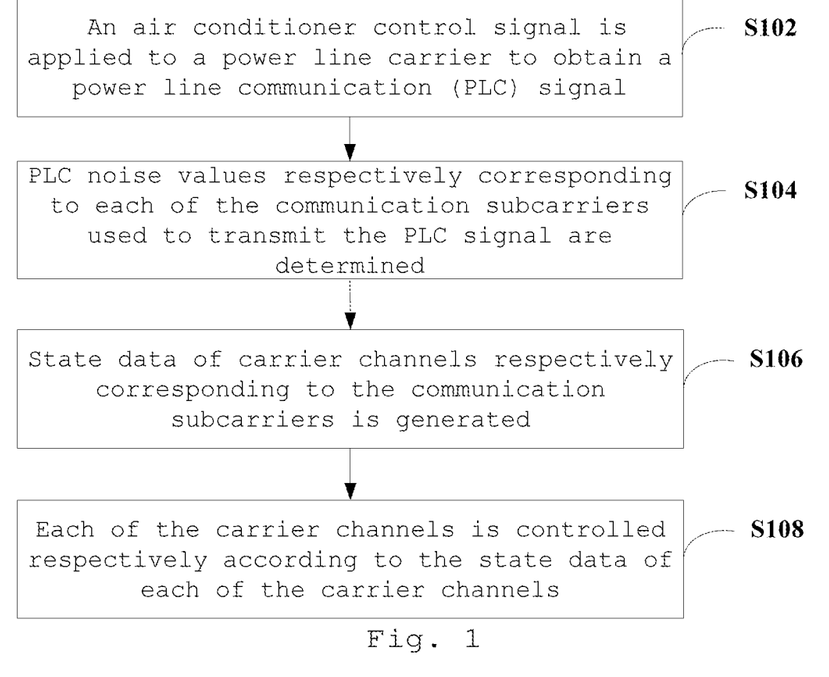
FIG. 1 is a flowchart of a carrier channel control method according to some embodiments of the present disclosure.

FIG. 1 is a flowchart of a carrier channel control method according to some embodiments of the present disclosure. As shown in FIG. 1, the carrier channel control method comprises the following steps: S102-S108.

In step S102, an air conditioner control signal is applied to a power line carrier to obtain a power line communication (PLC) signal. The power line carrier comprises a plurality of communication subcarriers.

In step S104, PLC noise values respectively corresponding to each of the communication subcarriers used to transmit the PLC signal are determined.

In step S106, state data of carrier channels respectively corresponding to the communication subcarriers is generated based on each of the PLC noise values which corresponds to one of the communication subcarriers. Each of the carrier channels respectively corresponds one of the communication subcarriers.

The state data of each of the carrier channels is used to identify whether the state of each of the carrier channels is Opened or Closed. Specifically, in some embodiments, a label "1" is added to a carrier channel the state of which is Opened in the carrier channels, and a label "0" is added to a carrier channel the state of which is Closed in the carrier channels. In this way, a mapping relationship is established between the PLC noise value corresponding to each of the communication subcarriers and each of the carrier channels.

In step S108, each of the carrier channels is controlled respectively according to the state data of each of the carrier channels.

For each of the communication subcarriers, the carrier channel corresponding to the communication subcarrier is controlled to be closed according to the state data of the carrier channel, in a case where a superimposed power value of the communication subcarrier is greater than an EMC threshold corresponding to a frequency point of the communication subcarrier.

Through the above embodiments, the air conditioner control signal is applied to the power line carrier to obtain the PLC signal, and then PLC noise values respectively corresponding to each of the communication subcarriers used to transmit the PLC signal is determined according to the PLC signal, and the state data of the carrier channels respectively corresponding to the communication subcarriers is generated each of the PLC noise values which corresponds to one of the communication subcarriers, and then each of the carrier channels is controlled respectively according to the state data of each of the carrier channels. Relative to the drawback of EMC bottleneck when applying the power line communication technology to an air conditioning system in the related art, according to the carrier channel control method in the embodiments of the present disclosure, in a case where the power line communication technology is applied to an air conditioning system and the PLC signal does not meet the EMC requirements, the transmission power value of the PLC signal meets the EMC requirements by dynamically adjusting the number of the communication subcarriers. A technical effect of the transmission power value of the PLC signal that meets the EMC requirements will be achieved by reducing the density of the communication subcarriers. Therefore, it solves the technical problem in the related art that the power line communication technology does not be applied effectively to an air conditioning system.

Figure 4:
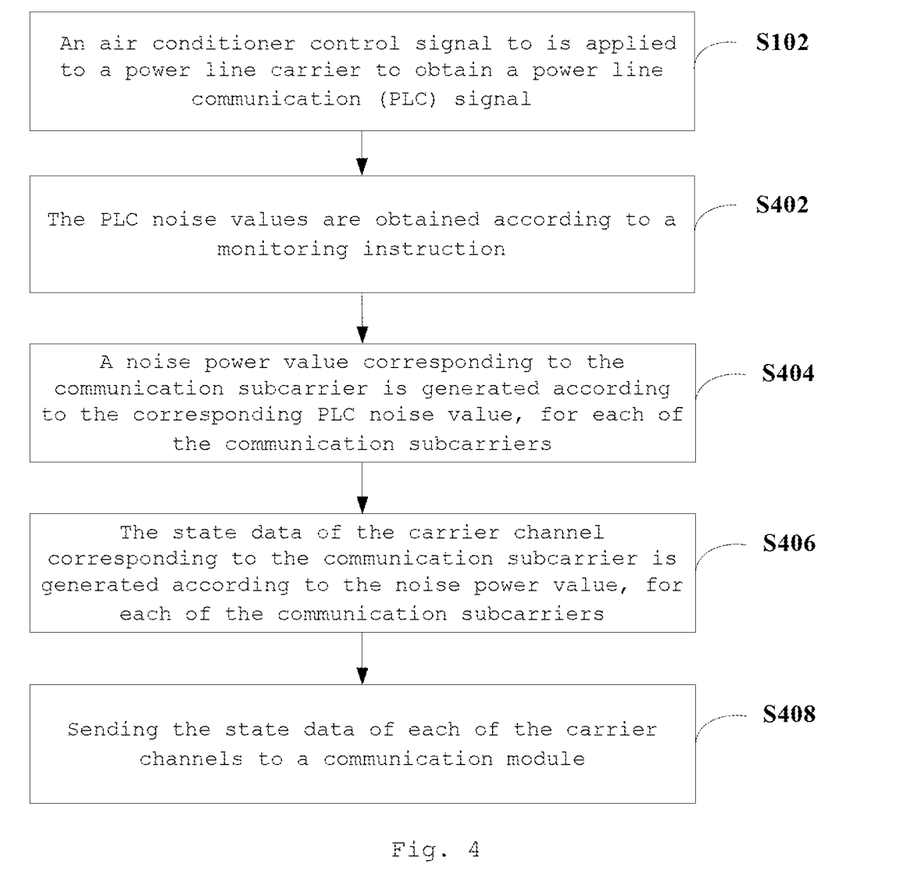
FIG. 4 is a flowchart of a carrier channel control method according to other embodiments of the present disclosure.

As shown in FIG. 4, in the above step S104, determining the PLC noise values respectively corresponding to each of the communication subcarriers used to transmit the PLC signal comprises: in step 402, the PLC noise values are obtained according to a monitoring instruction. The monitoring instruction comprises frequency points respectively corresponding to each of the communication subcarriers to be monitored, and each of PLC noise value comprises a background noise applied by the air conditioning unit itself to the power line carrier.

In some embodiments, determining the PLC noise values respectively corresponding to each of the communication subcarriers used to transmit the PLC signal further comprises: obtaining the PLC noise values by means of a spectrum analysis tool. In some embodiments, the spectrum analysis tool comprises at least one of a spectrum analyzer, or an EMC receiver.

For example, with the operation of the power line carrier, the air conditioning unit is powered on and starts to work. An air conditioning control module sends a real-time monitoring instruction to a noise monitoring module, and sends frequency points respectively corresponding to each of the communication subcarriers to be monitored. After receiving the monitoring instruction, the noise monitoring module starts to receive and analyze the noise values generated by the air conditioning unit on the power line in the process of operation in real time, and extracts an amplitude value according to the frequency point of each of the communication subcarriers to form data and return it to the air conditioning control module.

For another example, without the operation of the power line carrier, the air conditioning unit is powered on to work in a rated working state. A spectrum analysis tool (for example, a spectrum analyzer or an EMC receiver) is used to read noise spectrum values, and then the noise spectrum values respectively corresponding to each of the communication subcarriers is written into the air conditioning control module for storage and analysis.

In some embodiments, as shown in FIG. 4, in the above step S106, generating state data of carrier channels respectively corresponding to the communication subcarriers based on each of the PLC noise values which corresponds to one of the communication subcarriers comprises: in step S404, a noise power value corresponding to the communication subcarrier is generated according to the corresponding PLC noise value, for each of the communication subcarriers; and in step S406, the state data of the carrier channel corresponding to the communication subcarrier is generated according to the noise power value, for each of the communication subcarriers.

Figure 5:
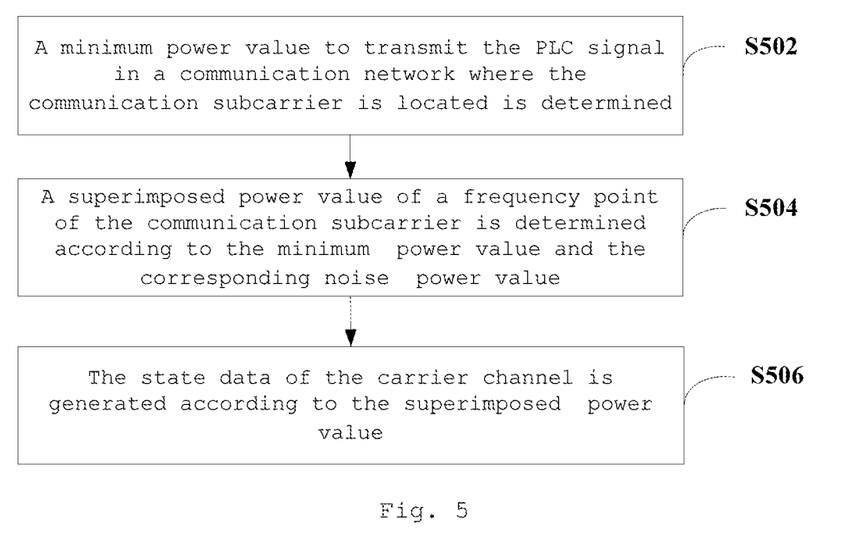
FIG. 5 is a flowchart of a carrier channel control method according to still other embodiments of the present disclosure.

In some embodiments, as shown in FIG. 5, in the step S406, generating the state data of the carrier channel corresponding to the communication subcarrier according to the noise power value comprises: in step S502, a minimum power value to transmit the PLC signal in a communication network where the communication subcarrier is located is determined; in step S504, a superimposed power value of a frequency point of the communication subcarrier is determined according to the minimum power value and the corresponding noise power value; and in step S506, the state data of the carrier channel is generated according to the superimposed power value.

Figure 6:
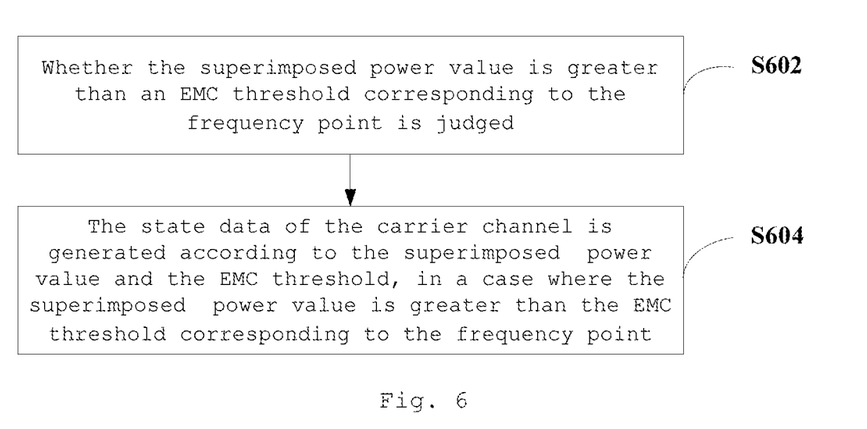
FIG. 6 is a flowchart of a carrier channel control method according to still other embodiments of the present disclosure.

In some embodiments, as shown in FIG. 6, in the step S506, generating the state data of the carrier channel according to the superimposed power value comprises: in step S602, whether the superimposed power value is greater than an electronic magnetic compatibility (EMC) threshold corresponding to the frequency point is judged; and in step S604, the state data of the carrier channel is generated according to the superimposed power value and the EMC threshold, in a case where the superimposed power value is greater than the EMC threshold corresponding to the frequency point.

For example, after the noise value of each of the communication subcarriers is received from the monitoring module or written externally, a superimposition operation is performed according to the minimum power value P1 to transmit the PLC signal allowed by the communication network, that is, P1 is added to the noise power value corresponding to each of the communication subcarriers to obtain the superimposed power value corresponding to each of the communication subcarriers. Then, for each of the communication subcarriers, the superimposed power value corresponding to the communication subcarrier is compared with the EMC threshold corresponding to the frequency point of the communication subcarrier, and in a case where the superimposed power value is greater than the EMC threshold corresponding to the frequency point of the communication subcarrier, the carrier channel corresponding to the communication subcarrier is recorded as to be closed. Since there are multiple communication subcarriers, it is necessary to calculate the superimposed power value of each of the communication subcarriers to form the state data of each of the carrier channels corresponding to each of the communication subcarriers. Then, the state data of each of the carrier channels is send to the communication module. The communication module adjusts the opening and closing state of each of the carrier channels corresponding to each of the communication subcarriers according to the above state data of each of the carrier channels to ensure that the air conditioning system communicates normally.

In some embodiments, as shown in FIG. 4, in the above step S108, controlling each of the carrier channels respectively according to the state data of each of the carrier channels comprises: in step S408, sending the state data of each of the carrier channels to a communication module, so that the communication module controls opening or closing of each of the carrier channels corresponding to each of the communication subcarriers according to the state data of each of the carrier channels.

Some embodiments of the present disclosure further provide a carrier channel control device. It should be noted that the carrier channel control device provided by the embodiments of the present disclosure are used to execute the carrier channel control method provided by the embodiments of the present disclosure. The carrier channel control device provided by some embodiments of the present disclosure will be described below.

Figure 2:
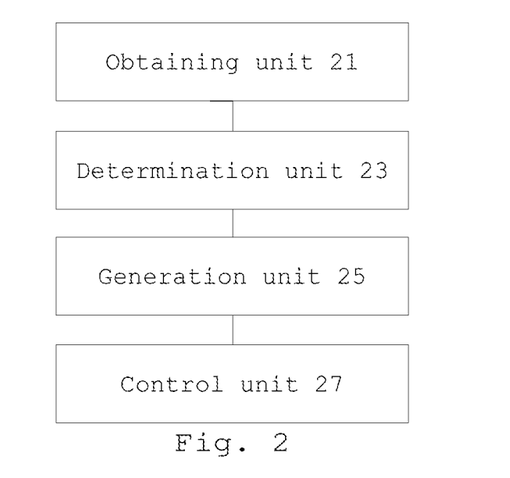
FIG. 2 is a schematic diagram of a carrier channel control device according to some embodiments of the present disclosure.

FIG. 2 is a schematic diagram of a carrier channel control device according to some embodiments of the present disclosure. As shown in FIG. 2, the carrier channel control device comprises: an obtaining unit 21, a determination unit 23, a generation unit 25, and a control unit 27. The carrier channel control device will be described in detail below.

The obtaining unit 21 is configured to apply an air conditioner control signal to a power line carrier to obtain a power line communication (PLC) signal. The power line carrier comprises a plurality of communication subcarriers.

The determination unit 23 is connected to the obtaining unit 21 and is configured to determine PLC noise values respectively corresponding to each of the communication subcarriers used to transmit the PLC signal.

The generation unit 25 is connected to the determination unit 23 and is configured to generate state data of carrier channels respectively corresponding to the communication subcarriers based on each of the PLC noise values which corresponds to one of the communication subcarriers. Each of the carrier channels respectively corresponds one of the communication subcarriers.

The control unit 27 is connected to the generation unit 25 and is configured to control each of the carrier channels respectively according to the state data of each of the carrier channels.

In the above embodiments, the obtaining unit is configured to add an air conditioner control signal to a power line carrier to obtain a power line carrier (PLC) signal; the determining unit is configured to determine PLC noise values respectively corresponding to each of the communication subcarriers used to transmit the PLC signal; the generating unit is configured to generate state data of carrier channels respectively corresponding to the communication subcarriers based on each of the PLC noise values which corresponds to one of the communication subcarriers; and the controlling unit is configured to control each of the carrier channels respectively according to the state data of each of the carrier channels. Relative to the drawback of EMC bottleneck when applying the power line communication technology to an air conditioning system in the related art, according to the carrier channel control method in the embodiments of the present disclosure, in a case where the power line communication technology is applied to an air conditioning system and the PLC signal does not meet the EMC requirements, the transmission power value of the PLC signal meets the EMC requirements by dynamically adjusting the number of the communication subcarriers. A technical effect of the transmission power value of the PLC signal that meets the EMC requirements are achieved by reducing the density of the communication subcarriers. Therefore, it solves the technical problem in the related art that the power line communication technology does not be applied effectively to an air conditioning system.

Figure 7:
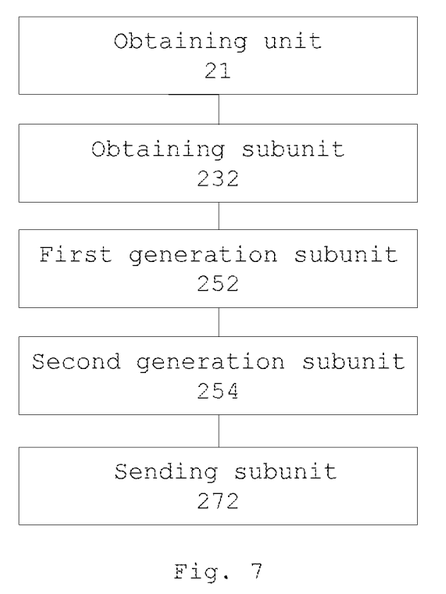
FIG. 7 is a schematic diagram of a carrier channel control device according to other embodiments of the present disclosure.

In some embodiments of the present disclosure, as shown in FIG. 7, the above determination unit 23 comprises: an obtaining subunit 232 configured to obtain the PLC noise values according to a monitoring instruction, wherein the monitoring instruction comprises frequency points respectively corresponding to each of the communication subcarriers to be monitored, and each of PLC noise value comprises a background noise applied by the air conditioning unit itself to the power line carrier.

In some embodiments of the present disclosure, the above generation unit 25 comprises: a first generation subunit 252 configured to generate a noise power value corresponding to the communication subcarrier according to the corresponding PLC noise value; and a second generation subunit 254 configured to generate the state data of the carrier channel corresponding to the communication subcarrier according to the noise power value.

Figure 8:
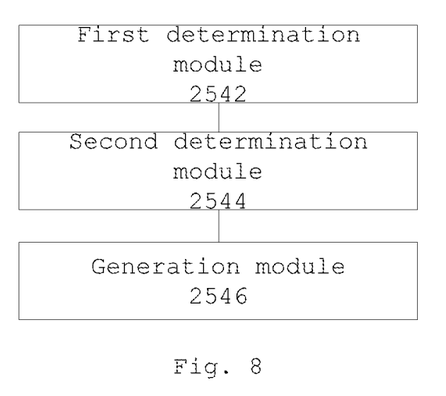
FIG. 8 is a schematic diagram of a carrier channel control device according to still other embodiments of the present disclosure.

In some embodiments of the present disclosure, as shown in FIG. 8, the above second generation unit 254 comprises: a first determination module 2542 configured to determine a minimum power value to transmit the PLC signal in a communication network where the communication subcarrier is located; a second determination module 2544 configured to determine a superimposed power value of a frequency point of the communication subcarrier according to the minimum power value and the corresponding noise power value; and a generation module 2546 configured to generate the state data of the carrier channel according to the superimposed power value.

Figure 9:
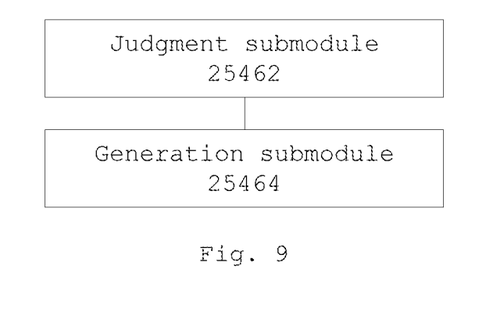
FIG. 9 is a schematic diagram of a carrier channel control device according to still other embodiments of the present disclosure.

In some embodiments of the present disclosure, shown in FIG. 9, the above generation module 2546 comprises: a judgment submodule 25462 configured to judge whether the superimposed power value is greater than an electronic magnetic compatibility (EMC) threshold corresponding to the frequency point; and a generation submodule 25464 configured to generate the state data of the carrier channel according to the superimposed power value and the EMC threshold, in a case where the superimposed power value is greater than the EMC threshold corresponding to the frequency point.

In some embodiments of the present disclosure, the above control unit 27 comprises: a sending subunit 272 configured to send the state data of each of the carrier channels to a communication module, so that the communication module controls opening or closing of each of the carrier channels corresponding to each of the communication subcarriers according to the state data of each of the carrier channels.

When the power line communication technology is applied to an air conditioning system in the related art, the communication signal will conflict with the EMC standard requirements, which will lead to an EMC bottleneck in the embodiments of the power line communication technology in the air conditioning system.

Figure 3:
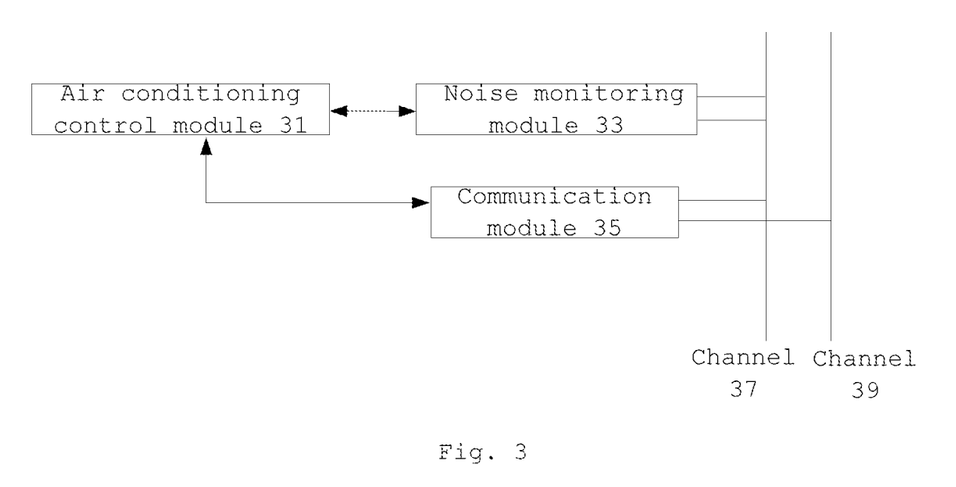
FIG. 3 is a schematic diagram of a carrier channel control system according to some embodiments of the present disclosure.

In order to solve the above problem, a carrier channel control system is provided in some embodiments of the present disclosure. FIG. 3 is a schematic diagram of a carrier channel control system according to some embodiments of the present disclosure. As shown in FIG. 3, in some embodiments, the carrier channel control system comprises: an air conditioning control module 31, a noise monitoring module 33, a communication module 35, and a channel 37 and a channel 39.

The air conditioning control module 31 is configured to determine a minimum value allowed for the communication network, and set its transmission power value and a minimum number of the communication subcarriers. It should be noted that the transmission power value is less than the threshold allowed by the EMC standard. The noise monitoring module 33 is configured to monitor the noise characteristics of the air conditioning unit in real time. The communication module 35 is configured to adjust the state of each of the carrier channels according to the state data of each of the carrier channels generated by the air conditioning control module 31. The channel 37 and the channel 39 are both connected to the noise monitoring module 33 and the communication module 35 for signal transmission.

Specifically, the air conditioning unit is powered on and starts to work. The air conditioning control module 31 sends a real-time monitoring instruction to the noise monitoring module 33, and sends a frequency point of each of the communication subcarriers to be monitored. After receiving the monitoring instruction, the noise monitoring module 33 starts to receive and analyze a noise value generated by the air conditioning unit on the power line in the process of operation in real time, and extracts an amplitude value according to the frequency point of each of the communication subcarriers to form data and return it to the air conditioning control module 31.

In addition, after the noise value of each of the communication subcarriers is received from the monitoring module or written externally, the air conditioning control module 31 is configured to perform a superimposition operation according to the minimum power value P1 to transmit the PLC signal allowed by the communication network, that is, adds P1 to the noise power value corresponding to each of the communication subcarriers to obtain the superimposed power value corresponding to each of the communication subcarriers. Then, the air conditioning control module 31 is configured to, for each of the communication subcarriers, compare the superimposed power value corresponding to the communication subcarrier with the EMC threshold corresponding to the frequency point of the communication subcarrier, and in a case where the superimposed power value is greater than the EMC threshold corresponding to the frequency point of the communication subcarrier, record the carrier channel corresponding to the communication subcarrier as to be closed. Since there are multiple communication subcarriers, the air conditioning control module 31 need to calculate the superimposed power value of each of the communication subcarriers to form the state data of each of the carrier channels corresponding to each of the communication subcarriers and sends the state data of each of the carrier channels to the communication module 35. The communication module 35 adjusts the opening and closing state of each of the carrier channels corresponding to each of the communication subcarriers according to the above state data of each of the carrier channels to ensure that the air conditioning system communicates normally.

In addition, it should be noted that, during the entire adjustment process, the above communication module 35 only serves as an execution unit, and the operation instructions need to be executed under the instruction of the air conditioning control module 31.

In some embodiments, the carrier channel control device described above further comprises a processor and a memory. The obtaining unit 21, the determination unit 23, the generation unit 25, and the control unit 27 are stored in the memory as program units. The processor executes the above program units stored in the memory to achieve the corresponding function.

The above processor contains a core, which retrieves corresponding program units from the memory. One or more cores are provided, and each of the carrier channels is controlled according to the state data of each of the carrier channels by adjusting core parameters.

In some embodiments, the above memory comprises non-transitory memory in a computer-readable medium, random access memory (RAM) and/or non-volatile memory, such as read only memory (ROM) or flash RAM. The memory comprises at least one memory chip.

According to some embodiments of the present disclosure, a non-transitory storage medium comprising a program stored thereon is further provided, wherein when the program is executed by a processor, cause the processor to perform the carrier channel control method according to any one of embodiments.

According to some embodiments of the present disclosure, a processor for executing a program is further provided, wherein the program when executed by the processor, cause the processor to perform the carrier channel control method according to any one of embodiments.

Figure 10:
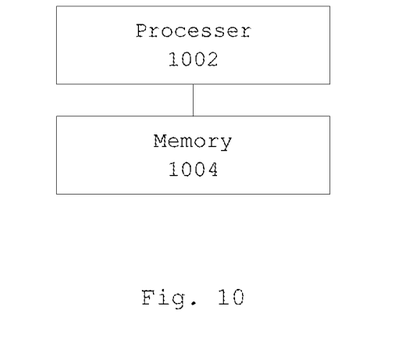
FIG. 10 is a schematic diagram of a carrier channel control device according to still other embodiments of the present disclosure.

According to some embodiments of the present disclosure, as shown in FIG. 10, a device is provided, comprising a processor 1002, a memory 1004, and a program stored on the memory and executable on the processor, which when executing the program implements the steps of applying an air conditioner control signal to a power line carrier to obtain a power line communication (PLC) signal, wherein, the power line carrier comprises a plurality of communication subcarriers; determining PLC noise values respectively corresponding to each of the communication subcarriers used to transmit the PLC signal; generating state data of carrier channels respectively corresponding to the communication subcarriers based on each of the PLC noise values which corresponds to one of the communication subcarriers, wherein each of the carrier channels respectively corresponds one of the communication subcarriers; and controlling each of the carrier channels respectively according to the state data of each of the carrier channels.

In some embodiments of the present disclosure, a computer program product is produced, which when executed on a data processing device, is suitable for executing a program initialized with the following method steps: applying an air conditioner control signal to a power line carrier to obtain a power line communication (PLC) signal, wherein, the power line carrier comprises a plurality of communication subcarriers; determining PLC noise values respectively corresponding to each of the communication subcarriers used to transmit the PLC signal; generating state data of carrier channels respectively corresponding to the communication subcarriers based on each of the PLC noise values which corresponds to one of the communication subcarriers, wherein each of the carrier channels respectively corresponds one of the communication subcarriers; and controlling each of the carrier channels respectively according to the state data of each of the carrier channels.

The sequence numbers of the above embodiments of the present disclosure are for description only, and do not represent superiority and inferiority of the embodiments.

In the above embodiments of the present disclosure, the description of each embodiment has its own emphasis. For a part that is not described in detail in an embodiment, reference is made to the related descriptions of other embodiments.

In the several embodiments provided by the present disclosure, it should be understood that the disclosed technical content should be implemented in other ways. The apparatus embodiments described above are only schematic. For example, the division of the units is a logical function division. In actual implementation, there will be other division manners. For example, multiple units or components are combined or integrated into another system, or some features are ignored or not implemented. In addition, the displayed or discussed mutual coupling or direct coupling or communication connection is indirect coupling or a communication connection through some interfaces, units or modules, and is electrical or in other forms.

The units described as separate components are or are not physically separated, and the component illustrated as a unit is or is not a physical unit, is located in one place, or distributed on multiple units. Some or all of the units are selected according to actual needs to implement the solution of the embodiments.

In addition, in some embodiments various functional units of embodiments of the present disclosure are integrated into one processing unit, or exist separately, or two or more units are integrated into one unit. In some embodiments, the above integrated unit is implemented in the form of hardware or a software functional unit.

If the integrated unit is implemented in the form of a software functional unit and sold or used as an independent product, it is stored in a computer-readable storage medium. Based on this understanding, the technical solution of the present disclosure or in other word, a portion thereof that contributes to the related technology or all or part of the technical solution is embodied in the form of a software product, which is stored in a storage medium, comprising instructions to cause a computer device (which is a personal computer, a server, or a network device, etc.) to perform all or part of the steps of the method described in the various embodiments of the present disclosure. The foregoing storage media comprise: USB flash disks, Read-Only Memory (ROM), Random Access Memory (RAM), mobile hard disks, magnetic disks, or optical disks and other media that used to store program code.

The above are only the embodiments of the present disclosure. It should be noted that, for a person skilled in the art, without departing away from the principle of the present disclosure, various modifications and ornaments made to the above embodiments are possible, and such modifications and ornaments should be regarded as within the protection scope of the present disclosure.

What is claimed is:
1. A carrier channel control method, comprising:
applying an air conditioner control signal to a power line carrier to obtain a power line communication (PLC) signal, wherein, the power line carrier comprises a plurality of communication subcarriers;
determining PLC noise values respectively corresponding to each of the communication subcarriers used to transmit the PLC signal;
generating state data of carrier channels respectively corresponding to the communication subcarriers based on each of the PLC noise values which corresponds to one of the communication subcarriers, wherein each of the carrier channels respectively corresponds to one of the communication subcarriers; and controlling each of the carrier channels respectively according to the state data of each of the carrier channels;

wherein generating the state data of carrier channels respectively corresponding to the communication subcarriers based on each of the PLC noise values which corresponds to one of the communication subcarriers comprises: for each of the communication subcarriers, generating a noise power value corresponding to the communication subcarrier according to the corresponding PLC noise value; and generating the state data of the carrier channel corresponding to the communication subcarrier according to the noise power value;

wherein controlling each of the carrier channels respectively according to the state data of each of the carrier channels comprises:

sending the state data of each of the carrier channels to a communication module, wherein the communication module controls opening or closing of each of the carrier channels corresponding to each of the communication subcarriers according to the state data of each of the carrier channels.

2. The method according to claim 1, wherein determining the PLC noise values respectively corresponding to each of the communication subcarriers used to transmit the PLC signal comprises:

obtaining the PLC noise values according to a monitoring instruction, wherein the monitoring instruction comprises frequency points respectively corresponding to each of the communication subcarriers to be monitored, and each PLC noise value comprises a background noise applied by an air conditioning unit itself to the power line carrier.

3. The method according to claim 1, wherein generating the state data of the carrier channel corresponding to the communication subcarrier according to the noise power value comprises:

determining a minimum power value to transmit the PLC signal in a communication network where the communication subcarrier is located;

determining a superimposed power value of a frequency point of the communication subcarrier according to the minimum power value and the corresponding noise power value; and generating the state data of the carrier channel according to the superimposed power value.

4. The method according to claim 3, wherein generating the state data of the carrier channel according to the superimposed power value comprises:

judging whether the superimposed power value is greater than an electronic magnetic compatibility (EMC) threshold corresponding to the frequency point; and generating the state data of the carrier channel according to the superimposed power value and the EMC threshold, in a case where the superimposed power value is greater than the EMC threshold corresponding to the frequency point.

5. A non-transitory storage medium, comprising a computer program, when executed by a processor, cause the processor to perform the carrier channel control method according to claim 1.

6. The non-transitory storage medium according to claim 5, wherein determining the PLC noise values respectively corresponding to each of the communication subcarriers used to transmit the PLC signal comprises:

obtaining the PLC noise values according to a monitoring instruction, wherein the monitoring instruction comprises frequency points respectively corresponding to each of the communication subcarriers to be monitored, and each PLC noise value comprises a background noise applied by an air conditioning unit itself to the power line carrier.

7. The non-transitory storage medium according to claim 5, wherein generating the state data of the carrier channel corresponding to the communication subcarrier according to the noise power value comprises:

determining a minimum power value to transmit the PLC signal in a communication network where the communication subcarrier is located;

determining a superimposed power value of a frequency point of the communication subcarrier according to the minimum power value and the corresponding noise power value; and generating the state data of the carrier channel according to the superimposed power value.

8. The non-transitory storage medium according to claim 7, wherein generating the state data of the carrier channel according to the superimposed power value comprises:

judging whether the superimposed power value is greater than an electronic magnetic compatibility (EMC) threshold corresponding to the frequency point; and generating the state data of the carrier channel according to the superimposed power value and the EMC threshold, in a case where the superimposed power value is greater than the EMC threshold corresponding to the frequency point.

9. A processor for executing a program, wherein the program when executed by the processor, cause the processor to perform the carrier channel control method according to claim 1.

10. A carrier channel control device, comprising:

an obtaining unit configured to apply an air conditioner control signal to a power line carrier to obtain a power line communication (PLC) signal, wherein, the power line carrier comprises a plurality of communication subcarriers;

a determining unit configured to determine PLC noise values respectively corresponding to each of the communication subcarriers used to transmit the PLC signal;

a generating unit configured to generate state data of carrier channels respectively corresponding to the communication subcarriers based on each of the PLC noise values which corresponds to one of the communication subcarriers, wherein each of the carrier channels respectively corresponds to one of the communication subcarriers; and a controlling unit configured to control each of the carrier channels respectively according to the state data of each of the carrier channels;

wherein the generating unit configured to generate a noise power value corresponding to the communication subcarrier according to the corresponding PLC noise value; and generate the state data of the carrier channel corresponding to the communication subcarrier according to the noise power value; and the controlling unit configured to send the state data of each of the carrier channels to a communication module, wherein the communication module controls opening or closing of each of the carrier channels corresponding to each of the communication subcarriers according to the state data of each of the carrier channels.

11. A carrier channel control device, comprising:
a processer; and
a memory coupled to the processor and storing instructions that when executed by the processor, cause the processor to:
apply an air conditioner control signal to a power line carrier to obtain a power line communication (PLC) signal, wherein, the power line carrier comprises a plurality of communication subcarriers;
determine PLC noise values respectively corresponding to each of the communication subcarriers used to transmit the PLC signal;
generate state data of carrier channels respectively corresponding to the communication subcarriers based on each of the PLC noise values which corresponds to one of the communication subcarriers, wherein each of the carrier channels respectively corresponds to one of the communication subcarriers; and
control each of the carrier channels respectively according to the state data of each of the carrier channels;
wherein generating the state data of carrier channels respectively corresponding to the communication subcarriers based on each of the PLC noise values which corresponds to one of the communication subcarriers comprises: for each of the communication subcarriers,
generating a noise power value corresponding to the communication subcarrier according to the corresponding PLC noise value; and
generating the state data of the carrier channel corresponding to the communication subcarrier according to the noise power value;
wherein controlling each of the carrier channels respectively according to the state data of each of the carrier channels comprises:
sending the state data of each of the carrier channels to a communication module, wherein the communication module controls opening or closing of each of the carrier channels corresponding to each of the communication subcarriers according to the state data of each of the carrier channels.

12. The carrier channel control device according to claim 11, wherein determining the PLC noise values respectively corresponding to each of the communication subcarriers used to transmit the PLC signal comprises:
obtaining the PLC noise values according to a monitoring instruction, wherein the monitoring instruction comprises frequency points respectively corresponding to each of the communication subcarriers to be monitored, and each PLC noise value comprises a background noise applied by an air conditioning unit itself to the power line carrier.

13. The carrier channel control device according to claim 11, wherein
generating the state data of the carrier channel corresponding to the communication subcarrier according to the noise power value comprises:
determining a minimum power value to transmit the PLC signal in a communication network where the communication subcarrier is located;
determining a superimposed power value of a frequency point of the communication subcarrier according to the minimum power value and the corresponding noise power value; and
generating the state data of the carrier channel according to the superimposed power value.

14. The carrier channel control device according to claim 13, wherein generating the state data of the carrier channel according to the superimposed power value comprises:
judging whether the superimposed power value is greater than an electronic magnetic compatibility (EMC) threshold corresponding to the frequency point; and
generating the state data of the carrier channel according to the superimposed power value and the EMC threshold, in a case where the superimposed power value is greater than the EMC threshold corresponding to the frequency point.

* * * * *